US007671118B2

(12) United States Patent
Wehner et al.

(10) Patent No.: US 7,671,118 B2
(45) Date of Patent: Mar. 2, 2010

(54) STABILIZER SYSTEM FOR STABILIZING HALOGEN-CONTAINING POLYMERS

(75) Inventors: Wolfgang Wehner, Zwingenberg (DE); Hans-Helmut Friedrich, Lautertal-Gadernheim (DE)

(73) Assignee: Chemtura Vinyl Additives, GmbH, Lampertheim (DE)

( * ) Notice: Subject to any disclaimer, the term of this patent is extended or adjusted under 35 U.S.C. 154(b) by 696 days.

(21) Appl. No.: 11/391,836

(22) Filed: Mar. 28, 2006

(65) Prior Publication Data

US 2006/0192179 A1 Aug. 31, 2006

Related U.S. Application Data

(62) Division of application No. 10/467,947, filed as application No. PCT/US01/14606 on Dec. 12, 2001, now Pat. No. 7,077,981.

(30) Foreign Application Priority Data

Feb. 16, 2001 (DE) ................................ 101 07 329

(51) Int. Cl.
*C08K 5/3415* (2006.01)
*C08G 73/20* (2006.01)
*C08G 73/06* (2006.01)
*C01B 11/18* (2006.01)

(52) U.S. Cl. ........................... 524/104; 524/87; 524/89; 524/401; 524/438; 252/187.31; 252/400.1; 252/400.52; 252/402; 252/403; 252/404; 252/405

(58) Field of Classification Search .................. 252/403, 252/404; 524/89
See application file for complete search history.

(56) References Cited

U.S. PATENT DOCUMENTS

| 3,412,139 | A | | 11/1968 | Heinz et al. | |
|---|---|---|---|---|---|
| 4,000,100 | A | | 12/1976 | Baldyga | |
| 4,590,233 | A | | 5/1986 | Erwied et al. | |
| 4,957,954 | A | * | 9/1990 | Iizuka et al. | 524/102 |
| 4,963,608 | A | | 10/1990 | Kunieda et al. | |
| 5,543,449 | A | * | 8/1996 | Drewes et al. | 524/114 |
| 5,814,691 | A | * | 9/1998 | Kuhn et al. | 524/102 |
| 5,859,100 | A | | 1/1999 | Wehner et al. | |
| 5,969,015 | A | * | 10/1999 | Zinke et al. | 524/109 |
| 6,274,654 | B1 | | 8/2001 | Wehner et al. | |
| 6,310,128 | B1 | * | 10/2001 | Hilti et al. | 524/378 |
| 7,077,981 | B2 | * | 7/2006 | Wehner et al. | 252/400.1 |
| 7,393,887 | B2 | * | 7/2008 | Friedrich et al. | 524/247 |
| 2002/0091179 | A1 | * | 7/2002 | Norris | 524/79 |
| 2004/0132874 | A1 | * | 7/2004 | Hauk et al. | 524/86 |
| 2004/0204522 | A1 | * | 10/2004 | Austen et al. | 524/99 |

FOREIGN PATENT DOCUMENTS

| DE | 746081 | | 12/1943 |
|---|---|---|---|
| DE | 1544768 | | 4/1970 |
| DE | 3843581 | A1 | 12/1988 |
| DE | 19741778 | A1 | 3/1998 |
| EP | 0394547 | A2 | 11/1990 |
| EP | 0457471 | A2 | 11/1991 |
| EP | 0967245 | A1 | 3/1999 |
| JP | 50039342 | | 4/1975 |
| JP | 60094440 | | 5/1985 |
| JP | 60094441 | | 5/1985 |
| JP | 63057656 | | 12/1988 |
| WO | WO93/20135 | | 10/1993 |
| WO | WO94/24200 | | 10/1994 |

OTHER PUBLICATIONS

*PVC Technology*, Fourth Edition. W.V. Titow. Elsevier Applied Science Publishers, London and New York, pp. 165-170. (1984).
*Plastics Additives Handbook*—Stabilizers, Processing Aids, Plasticizers, Fillers, Reinforcements, Colorants for Thermoplastics. $3^{rd}$ Edition. Hanser Publishers, Munich, Vienna, New York. pp. 390-393 (1990).
*Polyvinylchlorid*, Kunstoff Handbuch 2/1, Herausgegeben von Dr. K. Felger. Hanser. pp. 531-538 (1985).
*Polyvinylchloride* Kunstoff Handbuch 2/2. Herausgegeben von Dr. Hans K. Felger. pp. 1236-1277 (1985).
*Plastics Additives Handbook*—Stabilizers, Process Aids, Plasticizers, Fillers, Reinforcements, Colorants for Thermoplastics. $3^{rd}$ edition. Edited by R. Gachter and H. Muller. pp. 303-311. (1990).
*Plastics Additives Handbook*—Stabilizers, Processing Aids, Plasticizers, Fillers, Reinforcements, Colorants for Thermoplastics. $3^{rd}$ Edition. Edited by R. Gachter and H. Muller. Hanser Publishers, Munich; Vienna; New York. pp. 392-397 (1990).
*Plastics Additives Handbook*—Stabilizers, Process Aids, Plasticizers, Fillers, Reinforcements, Colorants for Thermoplastics. $3^{rd}$ edition. Edited by R. Gachter and H. Muller. pp. 524-591. Hanser Publishers, Munich; Vienna; New York. (1990).
Kirk-Othmer *Encyclopedia of Chemical Technology*, Fourth edition, vol. 12. Heat Stabilizers. pp. 1071-1091. Publisher: John Wiley & Sons. (1992).
*Handbook of Polyvinyl Chloride Formulating*. Edited by Edward J. Wickson. Published by John Wiley & Sons. Section 1-3-Carbonate Fillers. pp. 393-429 (1993).
*Plastics Additives*—An A-Z Reference: edited by Geoffrey Pritchard. Published by Chapman & Hall. "Antistatic Agents" by Geoffrey Pritchard. pp. 108-543 (1998).
Commission of the European Communities. CS/PM/2356. Brussels May 15, 1994. Synoptic Document No. 7. Draft of provisional list of monomers and additives used in the manufacture of plastics and coatings intended to come into contact with foodstuffs. pp. 2-56. (1994).

* cited by examiner

*Primary Examiner*—Joseph D Anthony
(74) *Attorney, Agent, or Firm*—Katten Muchin Rosenman LLP.

(57) ABSTRACT

A stabilizer system for stabilizing halogen-containing polymers comprising a perchlorate salt and at least one indole compound, a composition comprising such a stabilizer system, process for stabilizing a chlorine-containing polymer using such a stabilizer system, and an article manufacture comprising PVC stabilized by such a stabilizer system.

12 Claims, No Drawings

STABILIZER SYSTEM FOR STABILIZING HALOGEN-CONTAINING POLYMERS

This application is a divisional of U.S. patent application Ser. No. 10/467,947, now U.S. Pat. No. 7,077,981, which is a 371 of PCT/US01/14606 filed on Dec. 12, 2001.

The invention relates to stabilizer systems encompassing at least one perchlorate salt and at least one or more compounds from the groups consisting of the enamines, indoles and ureas, which are suitable for stabilizing halogen-containing polymers.

A halogen-containing polymer, such as PVC, may be stabilized by any of a large number of additives. Compounds of lead, of barium, and of cadmium are particularly well suited to this purpose, but are nowadays controversial for environmental reasons or because of their heavy metal content (cf. "Kunststoffadditive"[Plastics Additives], R. Gächter and H. Müller, Carl Hanser Verlag, 3rd Edition 1989, pp. 303-311 (see also 4th Edition 2001); and "Kunststoff Handbuch PVC" [Plastics Handbook PVC], Volume 2/1, W. Becker and D. Braun, Carl Hanser Verlag, 2nd Edition, 1985, pp. 531-538; and Kirk-Othmer: "Encyclopedia of Chemical Technology", 4th Edition, 1994, Vol. 12, Heat Stabilizers, pp. 1071-1091).

There is therefore a continuing search for effective stabilizers and stabilizer systems which are free from lead, barium and cadmium.

It has now been found that systems made from at least one or more compounds from the groups consisting of the enamines, indoles and ureas, and from at least one perchlorate salt, are particularly highly suitable for stabilizing chlorine-containing polymers, in particular PVC.

This is surprising, since mixtures made from aminocrotonic esters and epoxy compounds exhibit "non-specific" effects. This is seen by way of example in Table 1B, from which it is apparent that the use of the organic stabilizer 2-phenylindole and of the free-radical scavenger Wessalith (mixture 1/3) reduces the level of stabilization to an unexpectedly drastic extent when compared with the sole use of the organic stabilizer (mixture 1/1), but the use of the organic stabilizer and of the free-radical scavenger combined with the salt sodium perchlorate as stabilizer (mixture 1/4) results in a surprising, synergistic rise in stability.

The invention accordingly provides stabilizer systems comprising at least a) one perchlorate salt and b) at least one or more enamines and/or indole and/or ureas where the enamines have the formula (I)>

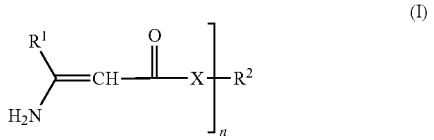

where n=1 or 2 and X=O or NR$^1$, n=3-6 and X=O;

R$^1$=H, C$_1$-C$_4$-alkyl, C$_2$-C$_6$-alkenyl, C$_6$-C$_{10}$-aryl, C$_7$-C$_{18}$-alkaryl or C$_7$-C$_{18}$-aralkyl;

R$^2$ (for n=1)=C$_1$-C$_{22}$-alkyl, C$_2$-C$_{22}$-alkenyl or aryl, preferably phenyl, where appropriate substituted with up to 3 hydroxyl, C$_1$-C$_4$-alkoxy or C$_1$-C$_9$-alkyl; or R$^2$ (for n=2-6)=linear or branched C$_n$-C$_{22}$-alkylene, where appropriate interrupted by one or more O atoms or S atoms, where R$^2$ (for n=3) may also be C$_2$-C$_3$-alkyl-trisubstituted isocyanurate;

and if X=NH, R$^2$ may also be H, and where the indoles have the general formula (II)

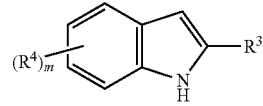

where m=0, 1, 2 or 3;

R$^3$=H, C$_1$-C$_{18}$-alkyl, C$_2$-C$_{18}$-alkenyl, C$_6$-C$_{10}$-aryl or

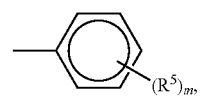

C$_7$-C$_{24}$-alkaryl, C$_7$-C$_{10}$-aralkyl or C$_1$-C$_4$-alkoxy;

R$^4$, R$^5$=H, C$_1$-C$_4$-alkyl, or C$_1$-C$_4$-alkoxy; and where the ureas have the general formula (III)

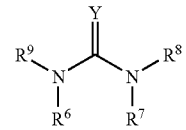

where

Y=O, S or NH;

R$^6$, R$^7$, R$^8$ and R$^9$, independently of one another, are H, C$_1$-C$_{18}$-alkyl, where appropriate substituted with hydroxyl groups and/or C$_1$-C$_4$-alkoxy groups, C$_2$-C$_{18}$-alkenyl, C$_6$-C$_{10}$-aryl, where appropriate substituted with up to 3 hydroxyl and/or C$_1$-C$_4$-alkyl/alkoxy groups, C$_7$-C$_{20}$-alkaryl or C$_7$-C$_{10}$-aralkyl, and two substituents from R$^6$ to R$^9$ may also form a ring, and the urea used may also be a dimerized or trimerized urea, e.g. biuret, triuret or 1,3,5-tris(hydroxyalkyl) isocyanurate;

and possible reaction products of these.

Examples of the enamines of the general formula (I) (X=O or NH) are compounds where R$^1$=hydrogen, methyl, ethyl, n-propyl, iso-propyl, n-butyl, iso-butyl, sec-butyl, tert-butyl, allyl, phenyl or benzyl, R$^2$ (for n=1)=1-octyl, 2-ethylhexyl, n-decyl, n-dodecyl, n-tetradecyl, n-hexadecyl, n-octadecyl, oleyl, dihydroxystearyl, trihydroxystearyl or ricinolyl, R$^2$ (for n=2)=derived from the corresponding R$^2$—(OH)$_2$ compound ethanediol, 1,4-butanediol, 1,3-butanediol, 2,3-butanediol, 1,6-hexanediol, neopentylene glycol, dialkylene glycol, trialkylene glycol, tetraalkylene glycol, pentaalkylene glycol, hexaalkylene glycol, preferably where alkylene=ethylene, propylene or butylene, thio(dialkylene glycol), dithio(trialkylene glycol), trithio(tetraalkylene glycol), tetrathio-(pentaalkylene glycol), pentathio(hexaalkylene glycol), preferably where alkylene=ethylene, or neopentylene glycol, R$^2$ (for n=3)=derived from the corresponding R$^2$—(OH)$_3$ compound glycerol, tris(hydroxyethyl) isocyanurate, tris(hydroxypropyl) isocyanurate, trimethylolethane or trimethylolpropane, $R^2$ (for n=4)=derived from the corresponding $R^2$—$(OH)_4$ compound erythritol, xylitol, pentaerythritol, bis(trimethylol)ethane or bis(trimethylol)propane, $R^2$ (for n=6)=derived from the corresponding $R^2$—$(OH)_6$ compound sorbitol, mannitol or dipentaerythritol.

Preference is given to enamines where $R^1$=methyl or phenyl.

The enamines of the general formula (I) may be prepared by known methods, by acylating and aminating the corresponding $R^2$—OH or $R^2$—$NH_2$ compound (see inter alia DE-C 1,544,768).

Preference is given to β-aminocrotonic ester compounds and β-aminocinnamic ester compounds of the general formula (I). Particularly preferred compounds of the general formula (I) are 1,4-butanediol bis(β-aminocrotonate), 2,3-butanediol bis(β-aminocrotonate), 1,2-dipropylene glycol bis(β-aminocrotonate) and thio (diethylene glycol)bis(β-aminocrotonate).

Examples of the indoles of the general formula (II) are compounds where $R^3$=methyl, ethyl, propyl, phenyl, allyl or benzyl, and $R^4$=methyl, ethyl, propyl or butyl. Preference is given to compounds of the general formula (II) where $R^3$=phenyl or phenyllauryl and $R^4$=hydrogen.

Compounds of the general formula (II) may be prepared by known methods (see, inter alia, DE-C 862,512).

Examples of these compounds are indole, 2-phenylindole, 2-phenyllaurylindole, 2-allylindole, 2-benzylindole, 2-phenylethylindole, 2-methylindole, 2-ethylindole, 2-propylindole, 2-butylindole and 2-phenyl-5-methylindole. Preference is given to 2-phenylindole and 2-phenyllaurylindole, and also 2-methylindole and 2-ethylindole.

2-Phenylindole is a particularly preferred compound of the general formula (II).

Examples of ureas of the general formula (III) are compounds where $R^6$, $R^7$, $R^8$ or $R^9$=hydrogen, methyl, phenyl, benzyl, phenethyl, hydroxyethyl, hydroxypropyl or hydroxybutyl. Preference is given to compounds of the general formula (III) where $R^6$, $R^7$, $R^8$ or $R^9$=phenyl or benzyl.

Compounds of the general formula (III) may be prepared by known methods (see, inter alia, DE-C 746,081, Italian Patent 386,750). Examples of these compounds are urea, N,N'-diphenylthiourea, N,N'-diphenylurea, N,N'-dibenzylthiourea, N,N'-dibenzylurea, N,N'-dimethylthiourea, N-benzylthiourea, N,N-dibenzylthiourea and N,N,N'-tribenzylthiourea, N,N'-diphenylguanidine, biuret and triuret. Preference is given to examples having phenyl and, respectively, ethylene- and propyleneurea, and also N,N'-bis(hydroxyethyl)urea and tris(hydroxyethyl/propyl) isocyanurate.

Particularly preferred compounds of the general formula (III) are N,N'-diphenylthiourea and N-phenylurea.

The perchlorate salts are known to the person skilled in the art. Examples of these are those of the formula $M(ClO_4)_n$, where M is Li, Na, K, Mg, Ca, Sr, Ba, Zn, Al, La or Ce; and n is 1, 2 or 3, depending on the valency of M. Use may be made of these perchlorate salts in their various commonly encountered forms, e.g. as salt or as solution in water or in an organic solvent, on their own or absorbed on a support, such as PVC, Ca silicate, zeolites or hydrotalcites. Examples of these are perchlorate salts complexed or dissolved using alcohols (polyols, cyclodextrins) or using ether alcohols or ester alcohols or crown ethers.

EP 0 394 547, EP 0 457 471 and WO 94/24200 describe other embodiments.

It is preferable to use sodium perchlorate or potassium perchlorate.

The invention also provides combinations of the stabilizer systems encompassing at least one perchlorate salt and at least one or more compounds from the groups consisting of the compounds of the general formula (I) or (II) or (III) with at least one or more other conventional additives or stabilizers. Preference is given to polyols and/or disaccharide alcohols, glycidyl compounds, hydrotalcites, zeolites (alkali metal aluminosilicates and alkaline earth metal aluminosilicates), fillers, metal soaps, alkali metal and alkaline earth metal compounds, such as oxides and hydroxides, lubricants, plasticizers, phosphites, pigments, epoxidized fatty esters and other epoxy compounds, antioxidants, UV absorbers and light stabilizers, optical brighteners and blowing agents. Particular preference is given to epoxidized soya oils, alkaline earth metal or aluminium soaps and phosphites.

Particular preference is given to those components which are suitable for producing physiologically non-hazardous products.

Examples of additional components of this type are listed and explained at a later stage below (cf. "Handbook of PVC Formulating" by E. J. Wickson, John Wiley & Sons, New York, 1993 and Synoptic Document No. 7, Scientific Committee for Food (SCF)-EU).

Polyols and Disaccharide Alcohols

Examples of possible compounds of this type are: glycerol, pentaerythritol, dipentaerythritol, tripentaerythritol, trimethylolethane, bis(trimethylolpropane), polyvinyl alcohol, bis(trimethylolethane), trimethylolpropane, sugars, sugar alcohols.

Of these, preference is given to pentaerythritol, trimethylolpropane, sorbitol and the disaccharide alcohols such as Malbit, lactitol and cellobiitol, and also Palatinit.

It is also possible to use polyol syrups, such as sorbitol syrup, mannitol syrup and maltitol syrup.

Examples of the amounts of the polyols used are from 0.01 to 20 parts by weight, advantageously from 0.1 to 20 parts by weight and in particular from 0.1 to 10 parts by weight, based on 100 parts by weight of PVC.

Glycidyl Compounds

These contain the glycidyl group

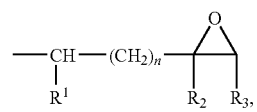

bonded directly to carbon, oxygen, nitrogen or sulphur atoms, either where both of $R_1$ and $R_3$ are hydrogen, $R_2$ is hydrogen or methyl and n=0 or where $R_1$ and $R_3$ together are —$CH_2$—$CH_2$— or —$CH_2$—$CH_2$—$CH_2$—, $R_2$ then being hydrogen and n being 0 or 1.

It is preferable to use glycidyl compounds having two functional groups. However, it is also possible in principle to use glycidyl compounds having one, three or more functional groups.

Use is predominantly made of diglycidyl compounds having aromatic groups.

The amounts used of the terminal epoxy compounds are preferably at least 0.1 part, preferably from 0.1 to 50 parts by weight, advantageously from 1 to 30 parts by weight and in particular from 1 to 25 parts, based on 100 parts by weight of PVC.

Hydrotalcites

The chemical composition of these compounds is known to the skilled worker, e.g. from the patents DE 3 843 581, U.S. Pat. No. 4,000,100, EP 0 062 813 and WO 93/20135.

Compounds from the hydrotalcite series may be described by the following formula

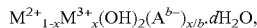
$$M^{2+}{}_{1-x}M^{3+}{}_x(OH)_2(A^{b-})_{x/b}\cdot dH_2O,$$

where $M^{2+}$=one or more of the metals selected from the group consisting of Mg, Ca, Sr, Zn and Sn
$M^{3+}$=Al or B,
$A^n$ an anion of valency n,
b is a number from 1-2,
$0<x<0.5$,
d is a number from 0-20.

Preference is given to compounds with
$A^n$=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ or $HPO_4^{2-}$;

Examples of hydrotalcites are
$Al_2O_3 \cdot 6MgO \cdot CO_2 \cdot 12H_2O$ (i), $Mg_{4.5}Al_2(OH)_{13} \cdot CO_3 \cdot 3.5H_2O$ (ii), $4MgO \cdot Al_2O_3 \cdot CO_2 \cdot 9H_2O$ (iii), $4MgO \cdot Al_2O_3 \cdot CO_2 \cdot 6H_2O$, $ZnO \cdot 3MgO \cdot Al_2O_3 \cdot CO_2 \cdot 8-9H_2O$ and $ZnO \cdot 3MgO \cdot Al_2O_3 \cdot CO_2 \cdot 5-6H_2O$.

Very particular preference is given to types (i), (ii) and (iii).

Zeolites (Aluminosilicates of Alkali Metals and/or of Alkaline Earth Metals)

These may be described by the following general formula $M_{x/n}[(AlO_2)_x(SiO_2)_y] \cdot wH_2O$, where n is the charge on the cation M;
M is an element of the first or second main group, such as Li, Na, K, Mg, Ca, Sr or Ba;
y:x is a number from 0.8 to 15, preferably from 0.8 to 1.2; and
w is a number from 0 to 300, preferably from 0.5 to 30.

Examples of zeolites are sodium aluminosilicates of the formulae
$Na_{12}Al_{12}Si_{12}O_{48} \cdot 27H_2O$ [zeolite A], $Na_6Al_6Si_6O_{24} \cdot 2NaX \cdot 7.5H_2O$, X=OH, halogen, $ClO_4$ [sodalite]; $Na_6Al_6Si_{30}O_{72} \cdot 24H_2O$; $Na_8Al_8Si_{40}O_{96} \cdot 24H_2O$; $Na_{16}Al_{16}Si_{24}O_{80} \cdot 16H_2O$; $Na_{16}Al_{16}Si_{32}O_{96} \cdot 16H_2O$; $Na_{56}Al_{56}Si_{136}O_{384} \cdot 250H_2O$ [zeolite Y], $Na_{86}Al_{86}Si_{106}O_{384} \cdot 264H_2O$ [zeolite X];

or the zeolites which can be prepared by partial or complete exchange of the Na atoms by Li atoms, K atoms, Mg atoms, Ca atoms, Sr atoms or Zn atoms, for example
$(Na,K)_{10}Al_{10}Si_{22}O_{64} \cdot 20H_2O$; $Ca_{4.5}Na_3[(AlO_2)_{12}(SiO_2)_{12}] \cdot 30H_2O$; $K_9Na_3[(AlO_2)_{12}(SiO_2)_{12}] \cdot 27H_2O$.

Very particular preference is given to Na zeolite A and Na zeolite P.

The hydrotalcites and/or zeolites may be used in amounts of, for example, 0.1 to 20 parts by weight, expediently 0.1 to 10 parts by weight and in particular 0.1 to 5 parts by weight, based on 100 parts by weight of halogen-containing polymer.

Fillers

Fillers such as calcium carbonate, dolomite, wollastonite, magnesium oxide, magnesium hydroxide, silicates, china clay, talc, glass fibres, glass beads, wood flour, mica, metal oxides or metal hydroxides, carbon black, graphite, rock flour, heavy spar, glass fibres, talc, kaolin and chalk are used. Preference is given to chalk (HANDBOOK OF PVC FORMULATING, E. J. Wickson, John Wiley & Sons, Inc., 1993, pp. 393-449) and reinforcing agents (TASCHENBUCH der Kunststoffadditive [Plastics Additives Handbook], R. Gächter & H. Müller, Carl Hanser, 1990, pp. 549-615).

The fillers may be used in amounts of preferably at least one part by weight, for example 5 to 200 parts by weight, expediently 10 to 150 parts by weight and in particular from 15 to 100 parts by weight, based on 100 parts by weight of PVC.

Metal Soaps

Metal soaps are primarily metal carboxylates, preferably of relatively long-chain carboxylic acids. Well-known examples of these are stearates, oleates, palmitates, ricinolates, hydroxystearates, dihydroxy-stearates and laurates, and also oleates and salts of relatively short-chain aliphatic or aromatic carboxylic acids, such as acetic acid, propionic acid, butyric acid, valeric acid, hexanoic acid, sorbic acid, oxalic acid, malonic acid, maleic acid, anthranilic acid, succinic acid, glutaric acid, adipic acid, fumaric acid, citric acid, benzoic acid, salicylic acid, phthalic acids, hemimellitic acid, trimellitic acid, pyromellitic acid.

Metals which should be mentioned are: Li, Na, K, Mg, Ca, Sr, Ba, Zn, Al, La, Ce and rare earth metals. Use is frequently made of so-called synergistic mixtures, such as barium/zinc stabilizers, magnesium/zinc stabilizers, calcium/zinc stabilizers or calcium/magnesium/zinc stabilizers. The metal soaps may be used either alone or in mixtures. An overview of common metal soaps is found in Ullmann's Encyclopedia of Industrial Chemistry, 5th Ed., Vol. A16 (1985), pp. 361 et seq.

The metal soaps or mixtures of these may be used in amounts of, for example, 0.001 to 10 parts by weight, expediently 0.01 to 8 parts by weight, particularly preferably 0.05 to 5 parts by weight, based on 100 parts by weight of PVC.

Alkali Metal and Alkaline Earth Metal Compounds

For the purposes of the present invention, these are mainly the carboxylates of the acids described above, but also corresponding oxides or, respectively, hydroxides or carbonates. Mixtures of these with organic acids are also possible. Examples are LiOH, NaOH, KOH, CaO, $Ca(OH)_2$, MgO, $Mg(OH)_2$, $Sr(OH)_2$, $Al(OH)_3$, $CaCO_3$ and $MgCO_3$ (and also basic carbonates, such as magnesia alba and huntite), and also fatty-acid salts of Na and of K. In the case of alkaline earth carboxylates and Zn carboxylates it is also possible to use adducts of these with MO or $M(OH)_2$ (M=Ca, Mg, Sr or Zn), so-called "overbased" compounds. In addition to the stabilizers according to the invention it is preferable to use alkali metal carboxylates, alkaline earth metal carboxylates and/or aluminium carboxylates.

Lubricants

Examples of possible lubricants are: fatty acids, fatty alcohols, montan wax, fatty acid esters, PE waxes, amide waxes, chloroparaffins, glycerol esters and alkaline earth metal soaps, and fatty ketones, and also the lubricants, or combinations of the lubricants, listed in EP 0 259 783. Stearic acid, stearic esters and calcium stearate are preferred.

Plasticizers

Examples of organic plasticizers are those from the following groups and mixtures thereof:
A) Phthalates: such as preferably di-2-ethylhexyl, diisononyl and diisodecyl phthalate, also known by the common abbreviations DOP (dioctyl phthalate, di-2-ethylhexyl phthalate), DINP (diisononyl phthalate), DIDP (diisodecyl phthalate), di($^nC_9$-$C_{12}$)phthalates, e.g. [sic] esters of aliphatic dicarboxylic acids, in particular esters of adipic, azelaic or sebacic acid: preferably di-2-ethylhexyl adipate and diisooctyl adipate.

C) Trimellitic esters, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl and tri-$C_9$-$C_{11}$-alkyl trimellitate. Common abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers: these are primarily epoxidized unsaturated fatty acids, e.g. epoxidized soybean oil (as described under the epoxidized fatty esters).

E) Polymeric plasticizers: the commonest starting materials for preparing polyester plasticizers are: dicarboxylic acids, such as adipic, phthalic, azelaic or sebacic acid; diols, such as 1,2-propanediol, 1,3-butanediol, 1,4-butanediol, 1,6-hexanediol, neopentyl glycol and diethylene glycol.

F) Phosphoric esters: a definition of these esters is given in the abovementioned "Taschenbuch der Kunststoffadditive" ["Plastics Additives Handbook"], Chapter 5.9.5, pp. 408-412. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate.

G) Chlorinated hydrocarbons (paraffins)

H) Hydrocarbons

I) Monoesters, e.g. butyl oleate, phenoxyethyl oleate, tetrahydrofurfuryl oleate and alkylsulphonates.

J) Glycol esters, e.g. diglycol benzoates.

K) Citric esters

A definition of these plasticizers and examples of the same are given in "Kunststoffadditive" ["Plastics Additives"], R. Gächter/H. Müller, Carl Hanser Verlag, 3rd Ed., 1989, Chapter 5.9.6, pp. 412-415, and in "PVC Technology", W. V. Titow, 4th Ed., Elsevier Publ., 1984, pp. 165-170. It is also possible to use mixtures of different plasticizers.

The plasticizers may be used in amounts of, for example, 5 to 20 parts by weight, expediently 10 to 20 parts by weight, based on 100 parts by weight of PVC. Rigid or semirigid PVC comprises preferably up to 10%, particularly preferably up to 5%, of plasticizer, or no plasticizer.

Pigments

Suitable substances are known to the skilled worker.

Examples of inorganic pigments are $TiO_2$, pigments based on zirconium oxide, $BaSO_4$, zinc oxide (zinc white) and lithopones (zinc sulphide/barium sulphate), carbon black, carbon black-titanium dioxide mixtures, iron oxide pigments, $Sb_2O_3$, $(Ti,Ba,Sb)O_2$, $Cr_2O_3$, spinels, such as cobalt blue and cobalt green, Cd(S,Se), ultramarine blue. Examples of organic pigments are azo pigments, phthalocyanine pigments, quinacridone pigments, perylene pigments, diketopyrrolopyrrole pigments and anthraquinone pigments. $TiO_2$ in micronized form is also preferred. Mixtures of various pigments may also be used. A definition and further descriptions are found in the "Handbook of PVC Formulating", E. J. Wickson, John Wiley & Sons, New York, 1993.

Phosphites (Triesters of Phosphorous Acid)

Organic phosphites are known costabilizers for chlorine-containing polymers. Examples of these are trioctyl, tridecyl, tridodecyl, tritridecyl, tripentadecyl, trioleyl, tristearyl, triphenyl, tricresyl, tris(nonylphenyl), tris(2,4-tert-butylphenyl) and tricyclohexyl phosphite.

Other suitable phosphites are various mixed aryl dialkyl or alkyl diarylphosphites, such as phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl and dodecyl bis(2,4-di-tert-butylphenyl)phosphite.

Advantageous use may also be made of phosphites of various di- or polyols: e.g. tetraphenyldipropylene glycol diphosphite, polydipropylene glycol phenyl phosphite, tetramethylolcyclohexanol decyl diphosphite, tetramethylolcyclohexanol butoxyethoxyethyl diphosphite, tetramethylolcyclohexanol nonylphenyl diphosphite, bis(nonylphenyl)di (trimethylolpropane) diphosphite, bis(2-butoxyethyl) di(trimethylolpropane) diphosphite, tris(hydroxyethyl) isocyanurate hexadecyl triphosphite, didecyl pentaerythrityl diphosphite, distearyl pentaerythrityl diphosphite, bis(2,4-di-tert-butylphenyl) entaerythrityl diphosphite, and also mixtures of these phosphites and aryl/alkyl phosphite mixtures of empirical composition $(H_{19}C_9\text{—}C_6H_4O)_{1.5}P(OC_{12,13}H_{25,27})_{1.5}$ or $[C_8H_{17}\text{—}C_6H_4\text{—}O\text{—}]_2P[i\text{-}C_8H_{17}O]$, $(H_{19}C_9\text{—}C_6H_4O)_{1.5}P(OC_{9,11}H_{19,23})_{1.5}$.

Industrial examples are Naugard P, Mark CH 300, Mark CH 301, Mark CH 302, Mark CH 304 and Mark CH 55.

Examples of total amounts of the organic phosphites used, or of mixtures thereof, are from 0.01 to 10 parts by weight, advantageously from 0.05 to 5, and in particular from 0.1 to 3 parts by weight, based on 100 parts by weight of PVC.

Epoxidized Fatty Acid Esters and Other Epoxy Compounds

The stabilizer combination of the invention may additionally and preferably comprise at least one epoxidized fatty acid ester. Possible compounds here are especially esters of fatty acids from natural sources (fatty acid glycerides), such as soya oil or rapeseed oil. However, it is also possible to use synthetic products, such as epoxidized butyl oleate. Use may also be made of epoxidized polybutadiene and polyisoprene, if desired also in a partially hydroxylated form, or of glycidyl acrylate and glycidyl methacrylate as homo- or copolymer. These epoxy compounds may also have been applied to an alumino salt compound; in this connection see also DE-A-4 031 818.

Examples of total amounts of the epoxy compounds used are preferably at least 0.1 part by weight, for example from 0.1 to 50 parts by weight, advantageously from 1 to 30 and in particular from 1 to 25 parts by weight, based on 100 parts by weight of PVC.

Antioxidants

Alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ethers, e.g. 2,2'-thiobis(6-tert-butyl-4-methylphenol), alkylidenebisphenols, e.g. 2,2'-methylenebis(6-tert-butyl-4-methylphenol), benzyl compounds, e.g. 3,5,3',5'-tetratert-butyl-4,4'-dihydroxydibenzyl ether, hydroxybenzylated malonates, e.g. dioctadecyl 2,2-bis(3,5-di-tert-butyl-2-hydroxybenzyl) malonate, hydroxybenzyl aromatics, e.g. 1,3,5-tris(3,5-di-tert-butyl-4-hydroxybenzyl)-2,4,6-trimethylbenzene, triazine compounds, e.g. 2,4-bisoctylmercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, acylaminophenols, e.g. 4-hydroxylauranilide, esters of beta-(3,5-ditert-butyl-4-hydroxyphenyl)propionic acid, beta-(5-tert-butyl-4-hydroxy-3-methylphenyl) propionic acid, beta-(3,5-dicyclohexyl-4-hydroxyphenyl) propionic acid, esters of 3,5-ditert-butyl-4-hydroxyphenylacetic acid with mono- or polyhydric alcohols, amides of beta-(3,5-ditert-butyl-4-hydroxyphenyl) propionic acid, such as, for example, N,N'-bis(3,5-ditert-butyl-4-hydroxyphenyl-propionyl)hexamethylenediamine, vitamin E (tocopherol) and derivatives. Mixtures of the antioxidants may also be used.

Industrial examples are Naugard 10, Naugard 76, Naugard BHT and Naugard 45.

Examples of the amounts of the antioxidants used are from 0.01 to 10 parts by weight, advantageously from 0.1 to 10 parts by weight and in particular from 0.1 to 5 parts by weight, based on 100 parts by weight of PVC.

UV Absorbers and Light Stabilizers

Examples of these are: 2-(2'-hydroxyphenyl)benzotriazoles, such as 2-(2'-hydroxy-5'-methylphenyl)-benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-ditertbutyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, sterically hindered amines, such as bis(2,2,6,6-tetramethylpiperidin-4-yl) sebacate, bis(2,2,6,6-tetramethylpiperidin-4-yl) succinate. Mixtures of the UV absorbers and/or light stabilizers may also be used.

Blowing Agents

Examples of blowing agents are organic azo compounds and organic hydrazo compounds, tetrazoles, oxazines, isatoic anhydride, and also soda and sodium bicarbonate. Preference is given to azodicarbonamide and sodium bicarbonate and also mixtures of these.

Definitions for and examples of impact modifiers and processing aids, gelling agents, antistats, biocides, metal deactivators, optical brighteners, flame retardants, antifogging agents and compatibilizers are given in "Kunststoffadditive" ["Plastics Additives"], R. Gächter/H. Müller, Carl Hanser Verlag, 3rd and 4th Ed., 1989 and 2001, and in "Handbook of Polyvinyl Chloride Formulating", E. J. Wilson, J. Wiley & Sons, 1993, and also in "Plastics Additives", G. Pritchard, Chapman & Hall, London, 1st edition, 1998.

Impact modifiers are also described in detail in "Impact Modifiers for PVC", J. T. Lutz/D. L. Dunkelberger, John Wiley & Sons, 1992.

Use may be made of one or more additives and/or mixtures thereof may be used.

The invention also provides compositions which comprise a chlorine-containing polymer and a stabilizer system of the invention.

The invention also provides compositions which comprise a chlorine-containing polymer and a stabilizer system of the invention in addition to one or more other components from one of the groups exemplified by glycidyl compounds, phosphites, hydrotalcites, zeolites, and alkali metal and alkaline earth metal compounds and epoxidized fatty esters.

The amounts of these compounds of the general formulae (I), (II) and (III) present for stabilization in these chlorine-containing polymer compositions are advantageously from 0.01 to 10 parts by weight, preferably from 0.05 to 5 parts by weight, in particular from 0.1 to 2 parts by weight based on 100 parts by weight of PVC.

Examples of the amount used of the perchlorate compounds are from 0.001 to 5 parts by weight, advantageously from 0.01 to 3 parts by weight, particularly preferably from 0.01 to 2 parts by weight, based on 100 parts by weight of PVC.

The co-additives such as glycidyl compounds, phosphites, hydrotalcites, zeolites, and alkali metal and alkaline earth metal compounds and epoxidized fatty esters are used at from 0.01 to 15 parts by weight, preferably from 0.1 to 10 parts by weight, in particular from 2 to 3 parts by weight.

Examples of the chlorine-containing polymers to be stabilized are:

polymers of vinyl chloride, of vinylidene chloride, vinyl resins whose structure contains vinyl chloride units, such as copolymers of vinyl chloride and vinyl esters of aliphatic acids, in particular vinyl acetate, copolymers of vinyl chloride with esters of acrylic or methacrylic acid and with acrylonitrile, copolymers of vinyl chloride with diene compounds and with unsaturated dicarboxylic acids or anhydrides of these, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers of the same with vinyl chloride and with other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, such as dichlorostyrene; chlorinated rubbers; chlorinated polymers of ethylene; polymers and postchlorinated polymers of chlorobutadiene and copolymers of these with vinyl chloride, chlorinated natural or synthetic rubbers, and also mixtures of the polymers mentioned with themselves or with other polymerizable compounds. For the purposes of this invention, PVC includes copolymers with polymerizable compounds, such as acrylonitrile, vinyl acetate or ABS, where these may be suspension polymers, bulk polymers or else emulsion polymers. Preference is given to a PVC homopolymer, also in combination with polyacrylates.

Other possible polymers are graft polymers of PVC with EVA, ABS or MBS. Other preferred substrates are mixtures of the abovementioned homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM or with polylactones, in particular from the group consisting of ABS, NBR, NAR, SAN and EVA. The abbreviations used for the copolymers are familiar to the skilled worker and have the following meanings: ABS: acrylonitrile-butadiene-styrene; SAN: styrene-acrylonitrile; NBR: acrylonitrile-butadiene; NAR: acrylonitrile-acrylate; EVA: ethylene-vinyl acetate. Other possible polymers are in particular styrene-acrylonitrile copolymers based on acrylate (ASA). A preferred component in this context is a polymer composition which comprises, as components (i) and (ii), a mixture of 25-75% by weight of PVC and 75-25% by weight of the copolymers mentioned. Components of particular importance are compositions made from (i) 100 parts by weight of PVC and (ii) 0-300 parts by weight of ABS and/or SAN-modified ABS and 0-80 parts by weight of the copolymers NBR, NAR and/or EVA, but in particular EVA.

For the purposes of the present invention it is also possible to stabilize in particular recycled materials of chlorine-containing polymers, specifically the polymers described in more detail above, which have been degraded by processing, use or storage. Recycled material from PVC is particularly preferred.

The compounds which may be used concomitantly according to the invention, and also the chlorine-containing polymers, are well known to the skilled worker and are described in detail in "Kunststoffadditive" ["Plastics Additives"], R.

Gächter/H. Müller, Carl Hanser Verlag, 3rd and 4th Ed., 1989 and 2001; in DE 197 41 778 and in EP-A 99 105 418.0 of 17.03.1999, which are incorporated herein by way of reference.

The stabilization according to the invention is particularly advantageous for rigid PVC formulations for transparent and non-transparent applications, as are common in pipes, profiles and sheets. For transparent applications, use is preferably made of compounds of the formula (I) or (II) or (III) which have a melting point below about 190° C. The stabilization is also useful for semirigid and flexible formulations, and also in plastisols. The stabilization requires no heavy metal compounds (Sn stabilizers, Pb stabilizers, Cd stabilizers, Zn stabilizers) and is particularly highly suitable for producing physiologically acceptable consumer products from PVC, including products for medical use.

The stabilizer systems may advantageously be incorporated by the following methods: as emulsion or dispersion; as a dry mixture during the mixing of added components or polymer mixtures; by direct addition into the processing apparatus (e.g. calender, mixer, kneader, extruder or the like) or as a solution or melt or, respectively, as flakes or pellets in a dust-free form as one-pack.

The PVC stabilized according to the invention, which is also provided by the invention, may be prepared in a manner known per se, by using equipment known per se, such as the abovementioned processing apparatus, to mix the stabilizer system of the invention and, if desired, other additives, with the PVC. The stabilizers here may be added individually or in a mixture, or else in the form of what are known as masterbatches.

The PVC stabilized as in the present invention may be brought into the desired shape in a known manner.

Examples of processes of this type are grinding, calendering, extruding, injection moulding and spinning, and also extrusion blowmoulding. The stabilized PVC may also be processed to give foams.

A PVC stabilized according to the invention is, particularly suitable for example, for hollow articles (bottles), packaging films (thermoformed films), blown films, pipes, foams, heavy profiles (window frames), translucent-wall profiles, construction profiles, sidings, fittings, office sheeting and apparatus housings (computers, household devices).

Preference is given to rigid PVC foam moldings and PVC pipes, for example for drinking water or wastewater, pressure pipes, gas pipes, cable-duct pipes and cable-protection pipes, pipes for industrial pipelines, drainpipes, outflow pipes, gutter pipes and drainage pipes. For more detail in this connection see "Kunststoffhandbuch PVC" ["Plastics Handbook PVC"], Vol. 2/2, W. Becker/H. Braun, 2nd Ed., 1985, Carl Hanser Verlag, pp. 1236-1277.

The examples below illustrate the invention but do not restrict the same. As in the remainder of the description, parts and percentages given are based on weight.

EXAMPLE 1

Dehydrochlorination Test on Treated PVC Powder

The mixtures made from PVC+additives in accordance with Tables 1A-5A and Table 7 below were pasted or dissolved using 150 ml of methanol. The mixture was then concentrated to dryness on a rotary evaporator at reduced pressure (<50 mbar) at a bath temperature of 40-45° C.

The PVC powder treated in accordance with this specification was then subjected to a dehydrochlorination test (DHC) at T=180° C., to DIN 53381. The thermal stability test for PVC is based on the elimination of gaseous hydrogen chloride on exposure to heat. For the purposes of this standard, the thermal stability of PVC is the time taken for elimination of hydrogen chloride to bring about an irreversible chemical change on exposure to heat. The higher the DHC value found (200 µS/cm) in min, the more effective the stabilizer system in inhibiting degradation of the chlorine-containing polymer.

The results have been incorporated into Tables 1A-5A and Table 7.

EXAMPLE 2

Dehydrochlorination Test on Milled Sheets

A premix made from PVC+additives in accordance with the amounts given in Tables 1B-5B was rolled for 5 minutes at 180° C. on mixing rolls. Test strips of film, thickness 0.5 mm, were taken from the resultant milled sheet and subjected to a dehydrochlorination test (DHC) at T=180° C., to DIN 53381 (cf. in this connection Example 1).

The results have been incorporated into Tables 1B-5B.

TABLE 1A

Dehydrochlorination test on treated PVC powder at 180° C.

| Mixture | 1/1 | 1/2 | 1/3 | 1/4 | 1/5 | 1/6 | 1/7 | 1/8 |
|---|---|---|---|---|---|---|---|---|
| Norvinyl S 6775 (S PVC K value 67) | 100 | 100 | 100 | 100 | 100 | 100 | 100 | 100 |
| Ca stearate | 0.6 | 0.6 | 0.6 | 0.6 | 0.6 | 0.6 | 0.6 | 0.6 |
| Wessalith P ®[1] | 1.0 | 1.0 | | | | | | |
| Araldit GY 250 ®[2] | | | 1.0 | 1.0 | | | | |
| Alkamizer I ®[4] | | | | | | | 1.0 | 1.0 |
| Stabilizer a) CD 36-0020[5] | | 0.1 | | 0.1 | | 0.1 | | 0.1 |
| Stabilizer b) 2-Phenylindole | 0.3 | 0.2 | 0.3 | 0.2 | 0.3 | 0.2 | 0.3 | 0.2 |
| DHC (200 µS/cm) in min | 82 | 115 | 123 | 151 | 96 | 130 | 104 | 196 |

[1] Na zeolite A ex Degussa
[2] Bisphenol A diglycidyl ether (liquid epoxy) ex Ciba
[3] Ca hydroxide ex Schaefer Kalk
[4] Hydrotalcite ex KYOWA (Japan)
[5] 30% strength sodium perchlorate monohydrate solution in butyl diglycol

TABLE 1B

Dehydrochlorination test on milled sheets at 180° C.

| Mixture | 1/1 | 1/2 | 1/3 | 1/4 | 1/5 | 1/6 |
|---|---|---|---|---|---|---|
| Norvinyl S 6775 (S PVC K value 67) | 100 | 100 | 100 | 100 | 100 | 100 |
| Ca stearate | 0.6 | 0.6 | 0.6 | 0.6 | 0.6 | 0.6 |
| Loxiol G 71 S[6] | 0.4 | 0.4 | 0.4 | 0.4 | 0.4 | 0.4 |
| Wessalith P ®[1] | | | 1.0 | 1.0 | | |
| Araldit GY 250 ®[2] | | | | | 1.0 | 1.0 |
| Stabilizer a) CD 36-0020[5] | | 0.1 | | 0.1 | | 0.1 |

TABLE 1B-continued

Dehydrochlorination test on milled sheets at 180° C.

| Mixture | 1/1 | 1/2 | 1/3 | 1/4 | 1/5 | 1/6 |
|---|---|---|---|---|---|---|
| Stabilizer b) 2-Phenylindole | 0.3 | 0.2 | 0.3 | 0.2 | 0.3 | 0.2 |
| DHC (200 µS/cm) in min | 61 | 93 | 20 | 155 | 100 | 179 |

[1)] Na zeolite A ex Degussa
[2)] Bisphenol A diglycidyl ether (liquid epoxy) ex Ciba
[3)] Ca hydroxide ex Schaefer Kalk
[5)] 30% strength sodium perchlorate monohydrate solution in butyl diglycol
[6)] Loxiol G 71 S = complex ester/lubricant ex Henkel It can be seen that the use of a) sodium perchlorate compound and b) 2-phenylindole leads to substantially better stabilization than the use of 2-phenylindole alone. It can also be seen that the stability can be further increased by adding one or more additives.

TABLE 2A

Dehydrochlorination test on treated PVC powder at 180° C.

| Mixture | 2/1 | 2/2 | 2/3 | 2/4 | 2/5 | 2/6 | 2/7 | 2/8 |
|---|---|---|---|---|---|---|---|---|
| Norvinyl S 6775 (S PVC K value 67) | 100 | 100 | 100 | 100 | 100 | 100 | 100 | 100 |
| Ca stearate | 0.6 | 0.6 | 0.6 | 0.6 | 0.6 | 0.6 | 0.6 | 0.6 |
| Wessalith P ®[1)] | 1.0 | 1.0 | | | | | | |
| Araldit GY 250 ®[2)] | | | 1.0 | 1.0 | | | | |
| Precal 50 S ®[3)] | | | | | 1.0 | 1.0 | | |
| Alkamizer I ®[4)] | | | | | | | 1.0 | 1.0 |
| Stabilizer a) CD 36-0020[5)] | | 0.1 | | 0.1 | | 0.1 | | 0.1 |
| Stabilizer b) 1,4-Butanediol bis(β-aminocrotonate) | 0.3 | 0.2 | 0.3 | 0.2 | 0.3 | 0.2 | 0.3 | 0.2 |
| DHC (200 µS/cm) in min | 57 | 88 | 64 | 127 | 55 | 86 | 65 | 104 |

[1)] Na zeolite A ex Degussa
[2)] Bisphenol A diglycidyl ether (liquid epoxy) ex Ciba
[3)] Ca hydroxide ex Schaefer Kalk
[4)] Hydrotalcite ex KYOWA (Japan)
[5)] 30% strength sodium perchlorate monohydrate solution in butyl diglycol

TABLE 2B

Dehydrochlorination test on milled sheets at 180° C.

| Mixture | 2/1 | 2/2 | 2/3 | 2/4 | 2/5 | 2/6 |
|---|---|---|---|---|---|---|
| Norvinyl S 6775 (S PVC K value 67) | 100 | 100 | 100 | 100 | 100 | 100 |
| Ca stearate | 0.6 | 0.6 | 0.6 | 0.6 | 0.6 | 0.6 |
| Loxiol G 71 S[6)] | 0.4 | 0.4 | 0.4 | 0.4 | 0.4 | 0.4 |
| Araldit GY 250 ®[2)] | | | 1.0 | 1.0 | | |
| Alkamizer I ®[4)] | | | | | 1.0 | 1.0 |
| Stabilizer a) CD 36-0020[5)] | | 0.1 | | 0.1 | | 0.1 |
| Stabilizer b) 1,4-Butanediol bis(β-aminocrotonate) | 0.3 | 0.2 | 0.3 | 0.2 | 0.3 | 0.2 |
| DHC (200 µS/cm) in min | 40 | 66 | 22 | 137 | 71 | 127 |

[2)] Bisphenol A diglycidyl ether (liquid epoxy) ex Ciba
[3)] Ca hydroxide ex Schaefer Kalk
[4)] Hydrotalcite ex KYOWA (Japan)
[5)] 30% strength sodium perchlorate monohydrate solution in butyl diglycol
[6)] Loxiol G 71 S = complex ester/lubricant ex Henkel It can be seen that the use of a) sodium perchlorate compound and b) 1,4-butanediol bis(β-aminocrotonate) leads to substantially better stabilization than the use of 1,4-butanediol bis(β-aminocrotonate) alone. It can also be seen that the stability can be further increased by adding one or more additives.

TABLE 3A

Dehydrochlorination test on treated PVC powder at 180° C.

| Mixture | 3/1 | 3/2 |
|---|---|---|
| Norvinyl S 6775 (S PVC K value 67) | 100 | 100 |
| Ca stearate | 0.6 | 0.6 |
| Wessalith P ®[1)] | 1.0 | 1.0 |
| Araldit GY 250 ®[2)] | | |
| Precal 50 S ®[3)] | | |
| Alkamizer I ®[4)] | | |
| Stabilizer a) CD 36-0020[5)] | | 0.1 |
| Stabilizer b) Thio (diethylene glycol) bis(β-aminocrotonate) | 0.3 | 0.2 |
| DHC (200 µS/cm) in min | 63 | 88 |

[1)] Na zeolite A ex Degussa
[2)] Bisphenol A diglycidyl ether (liquid epoxy) ex Ciba
[3)] Ca hydroxide ex Schaefer Kalk
[4)] Hydrotalcite ex KYOWA (Japan)
[5)] 30% strength sodium perchlorate monohydrate solution in butyl diglycol

TABLE 3B

Dehydrochlorination test on milled sheets at 180° C.

| Mixture | 3/1 | 3/2 | 3/3 | 3/4 | 3/5 | 3/6 |
|---|---|---|---|---|---|---|
| Norvinyl S 6775 (S PVC K value 67) | 100 | 100 | 100 | 100 | 100 | 100 |
| Ca stearate | 0.6 | 0.6 | 0.6 | 0.6 | 0.6 | 0.6 |
| Loxiol G 71 S[6)] | 0.4 | 0.4 | 0.4 | 0.4 | 0.4 | 0.4 |

TABLE 3B-continued

Dehydrochlorination test on milled sheets at 180° C.

| Mixture | 3/1 | 3/2 | 3/3 | 3/4 | 3/5 | 3/6 |
|---|---|---|---|---|---|---|
| Araldit GY 250 ®[2] | | | 1.0 | 1.0 | | |
| Alkamizer I ®[4] | | | | | 1.0 | 1.0 |
| Stabilizer a) CD 36-0020[5] | | 0.1 | | 0.1 | | 0.1 |
| Stabilizer b) Thio (diethylene glycol) bis(β-aminocrotonate) | 0.3 | 0.2 | 0.3 | 0.2 | 0.3 | 0.2 |
| DHC (200 μS/cm) in min | 49 | 75 | 14 | 143 | 78 | 134 |

[2] Bisphenol A diglycidyl ether (liquid epoxy) ex Ciba
[3] Ca hydroxide ex Schaefer Kalk
[4] Hydrotalcite ex KYOWA (Japan)
[5] 30% strength sodium perchlorate monohydrate solution in butyl diglycol
[6] Loxiol G 71 S = complex ester/lubricant ex Henkel It can be seen that the use of a) sodium perchlorate compound and b) thio(diethylene glycol)bis(β-aminocrotonate) leads to substantially better stabilization than the use of thio (diethylene glycol) bis(β-aminocrotonate) alone. It can also be seen that the stability can be further increased by adding one or more additives.

TABLE 4A

Dehydrochlorination test on treated PVC powder at 180° C.

| Mixture | 4/1 | 4/2 | 4/3 | 4/4 | 4/5 | 4/6 | 4/7 | 4/8 |
|---|---|---|---|---|---|---|---|---|
| Norvinyl S 6775 (S PVC K value 67) | 100 | 100 | 100 | 100 | 100 | 100 | 100 | 100 |
| Ca stearate | 0.6 | 0.6 | 0.6 | 0.6 | 0.6 | 0.6 | 0.6. | 0.6 |
| Wessalith P ®[1] | 1.0 | 1.0 | | | | | | |
| Araldit GY 250 ®[2] | | | 1.0 | 1.0 | | | | |
| Precal 50 S ®[3] | | | | | 1.0 | 1.0 | | |
| Alkamizer I ®[4] | | | | | | | 1.0 | 1.0 |
| Stabilizer a) CD 36-0020[5] | | 0.1 | | 0.1 | | 0.1 | | 0.1 |
| Stabilizer b) N,N'-Diphenylthiourea | 0.3 | 0.2 | 0.3 | 0.2 | 0.3 | 0.2 | 0.3 | 0.2 |
| DHC (200 μS/cm) in min | 39 | 90 | 55 | 112 | 40 | 73 | 46 | 87 |

[1] Na zeolite A ex Degussa
[2] Bisphenol A diglycidyl ether (liquid epoxy) ex Ciba
[3] Ca hydroxide ex Schaefer Kalk
[4] Hydrotalcite ex KYOWA (Japan)
[5] 30% strength sodium perchlorate monohydrate solution in butyl diglycol

TABLE 4B

Dehydrochlorination test on milled sheets at 180° C.

| Mixture | 4/1 | 4/2 | 4/3 | 4/4 | 4/5 | 4/6 |
|---|---|---|---|---|---|---|
| Norvinyl S 6775 (S PVC K value 67) | 100 | 100 | 100 | 100 | 100 | 100 |
| Ca stearate | 0.6 | 0.6 | 0.6 | 0.6 | 0.6 | 0.6 |
| Loxiol G 71 S[6] | 0.4 | 0.4 | 0.4 | 0.4 | 0.4 | 0.4 |
| Wessalith P ®[1] | | | 1.0 | 1.0 | | |
| Araldit GY 250 ®[2] | | | | | 1.0 | 1.0 |
| Stabilizer a) CD 36-0020[5] | | 0.1 | | 0.1 | | 0.1 |
| Stabilizer b) N,N'-Diphenylthiourea | 0.3 | 0.2 | 0.3 | 0.2 | 0.3 | 0.2 |
| DHC (200 μS/cm) in min | 25 | 54 | 38 | 100 | 57 | 122 |

[1] Na zeolite A ex Degussa
[2] Bisphenol A diglycidyl ether (liquid epoxy) ex Ciba
[3] Ca hydroxide ex Schaefer Kalk
[5] 30% strength sodium perchlorate monohydrate solution in butyl diglycol
[6] Loxiol G 71 S = complex ester/lubricant ex Henkel It can be seen that the use of a) sodium perchlorate compound and b) N,N'-diphenylthiourea leads to substantially better stabilization than the use of N,N'-diphenylthiourea alone. Indeed, comparison with the results in Table 6 shows that the addition of N,N'-diphenylthiourea on its own leads to destabilization of the PVC. Only when a) sodium perchlorate compound and b) N,N'-diphenylthiourea are used together is there a marked improvement in the stability of the PVC. It can also be seen that the stability can be further increased by adding one or more additives.

TABLE 5A

Dehydrochlorination test on treated PVC powder at 180° C.

| Mixture | 5/1 | 5/2 |
|---|---|---|
| Norvinyl S 6775 (S PVC K value 67) | 100 | 100 |
| Ca stearate | 0.6 | 0.6 |
| Wessalith P ®[1] | 1.0 | 1.0 |
| Araldit GY 250 ®[2] | | |
| Precal 50 S ®[3] | | |
| Alkamizer I ®[4] | | |
| Stabilizer a) CD 36-0020[5] | | 0.1 |
| Stabilizer b) N-Phenylurea | 0.3 | 0.2 |
| DHC (200 μS/cm) in min | 52 | 97 |

[1] Na zeolite A ex Degussa
[2] Bisphenol A diglycidyl ether (liquid epoxy) ex Ciba
[3] Ca hydroxide ex Schaefer Kalk
[4] Hydrotalcite ex KYOWA (Japan)
[5] 30% strength sodium perchlorate monohydrate solution in butyl diglycol

TABLE 5B

Dehydrochlorination test on milled sheets at 180° C.

| Mixture | 5/1 | 5/2 | 5/3 | 5/4 | 5/5 | 5/6 |
|---|---|---|---|---|---|---|
| Norvinyl S 6775 (S PVC K value 67) | 100 | 100 | 100 | 100 | 100 | 100 |
| Ca stearate | 0.6 | 0.6 | 0.6 | 0.6 | 0.6 | 0.6 |
| Loxiol G 71 S[6] | 0.4 | 0.4 | 0.4 | 0.4 | 0.4 | 0.4 |
| Araldit GY 250 ®[2] | | | 1.0 | 1.0 | | |
| Alkamizer I ®[4] | | | | | 1.0 | 1.0 |
| Stabilizer a) CD 36-0020[5] | | 0.1 | | 0.1 | | 0.1 |
| Stabilizer b) N-Phenylurea | 0.3 | 0.2 | 0.3 | 0.2 | 0.3 | 0.2 |
| DHC (200 μS/cm) in min | 40 | 61 | 59 | 131 | 51 | 111 |

[2] Bisphenol A diglycidyl ether (liquid epoxy) ex Ciba
[3] Ca hydroxide ex Schaefer Kalk
[4] Hydrotalcite ex KYOWA (Japan)
[5] 30% strength sodium perchlorate monohydrate solution in butyl diglycol
[6] Loxiol G 71 S = complex ester/lubricant ex Henkel It can be seen that the use of a) sodium perchlorate compound and b) N-phenylurea leads to substantially better stabilization than the use of N-phenylurea alone. It can also be seen that the stability can be further increased by adding one or more additives.

A mixture composed of
100.0 parts of Norvinyl S 6775
0.6 part of Ca stearate
0.4 part of Loxiol® G 71 S[6)]
0.6 part of CH 300 phosphite[7)] (ex Crompton)
1.0 part of Wessalith P/GY 250/Alkamizer I
0.1 part of CD 36-0020[5)]
0.2 part of organic stabilizer was processed at 180° C. on mixing rolls for 5 minutes. The resultant milled sheets were used for determination of the initial colour of the milled sheet in the form of the Yellowness Index (YI) to ASTM D-1925-70. Low YI values mean good stabilization and, respectively, initial colour.

The results are given in Table 6 below.

TABLE 6

Tests with and without CH 300 phosphite[7)] on milled sheets using the initial colour IC (YI) thermal test

| With phosphite | | Without phosphite | | | |
|---|---|---|---|---|---|
| Experiment number | HT/IC (YI) | Experiment number | HT/IC (YI) | Additive | Stabilizer |
| 384 | 29.32 | 6269 | 40.51 | — | 2-Phenyl indole |
| 389 | 33.29 | 6271 | 45.08 | Wessalith P | |
| 390 | 25.05 | 6273 | 36.24 | GY 250 | |
| 385 | 35.84 | 6274 | 43.55 | — | 1,4-Butanediol bis(β-aminocrotonate) |
| 391 | 37.08 | 6276 | 42.58 | GY 250 | |
| 392 | 40.21 | 6278 | 41.73 | Alkamizer I | |
| 386 | 34.54 | 6279 | 46.34 | — | Thiodiethylene glycol bis-(β-aminocrotonate) |
| 393 | 35.15 | 6281 | 44.07 | GY 250 | |
| 394 | 38.38 | 6283 | 40.08 | Alkamizer I | |
| 387 | 8.38 | 6284 | 17.54 | — | N,N'-diphenylthiourea |
| 395 | 9.36 | 6286 | 17.49 | Wessalith P | |
| 396 | 8.77 | 6288 | 13.51 | GY 250 | |
| 388 | 22.19 | 6289 | 37.99 | — | N-phenylurea |
| 397 | 22.36 | 6291 | 39.52 | GY 250 | |
| 398 | 30.39 | 6293 | 39.08 | Alkamizer I | |

[7)]CH 300 = mixed aryl/alkyl phosphite (ex Crompton)

It is apparent that addition of phosphites can give a yet further rise in initial-colour-based stabilization of the chlorine-containing polymer, using organic stabilizers in combination with a sodium perchlorate formulation.

TABLE 7

Comparative Experiment
Dehydrochlorination test on treated PVC powder at 180° C.

| Mixture | 7/1 | 7/2 | 7/3 | 7/4 | 7/5 | 7/6 | 7/7 | 7/8 |
|---|---|---|---|---|---|---|---|---|
| Norvinyl S 6775 (SPVC K value 67) | 100 | 100 | 100 | 100 | 100 | 100 | 100 | 100 |
| Ca stearate | 0.6 | 0.6 | 0.6 | 0.6 | 0.6 | 0.6 | 0.6 | 0.6 |
| Wessalith P ®[1)] | 1.0 | 1.0 | | | | | | |
| Araldit GY 250 ®[2)] | | | 1.0 | 1.0 | | | | |
| Precal 50 S ®[3)] | | | | | 1.0 | 1.0 | | |
| Alkamizer I ®[4)] | | | | | | | 1.0 | 1.0 |
| Stabilizer a) CD 36-0020[5)] | | 0.1 | | 0.1 | | 0.1 | | 0.1 |
| DHC (200 µS/cm) in min | 56 | 71 | 67 | 96 | 57 | 60 | 67 | 87 |

[1)]Na zeolite A ex Degussa
[2)]Bisphenol A diglycidyl ether (liquid epoxy) ex Ciba
[3)]Ca hydroxide ex Schaefer Kalk
[4)]Hydrotalcite ex KYOWA (Japan)
[5)]30% strength sodium perchlorate monohydrate solution in butyl diglycol It can be seen that the use of a) sodium perchlorate compound alone leads to only very slight improvements in stability compared with the stability without addition of any stabilizer.

What is claimed is:

1. A milled sheet of polyvinyl chloride comprising:
   0.1 phr of sodium perchlorate salt; and
   0.2 phr of 2-phenylindole.

2. The sheet of claim 1, further comprising one or more polyols and disaccharide alcohols, glycidyl compounds, hydrotalcites, alkali metal/alkaline earth metal aluminosilicates, alkali metal/alkaline earth metal hydroxides, alkaline earth metal oxides or alkaline earth metal (hydrogen) carbonates or metal carboxylates, phosphites, plasticizers, antioxidants, fillers, pigments, light stabilizers, lubricants and epoxidized fatty esters.

3. The sheet of claim 1, further comprising 0.4 phr of an ester lubricant.

4. The sheet of claim 1, further comprising 1.0 phr of a sodium zeolite.

5. The sheet of claim 1, further comprising 1.0 phr of a bisphenol A diglycidyl ether.

6. The sheet of claim 1, wherein the sodium perchlorate salt is a sodium perchlorate monohydrate solution.

7. A method of stabilizing a milled sheet of polyvinyl chloride comprising adding to the milled sheet a stabilizing composition comprising:
   0.1 phr of sodium perchlorate salt; and
   0.2 phr of 2-phenylindole.

8. The method of claim 7, further comprising one or more polyols and disaccharide alcohols, glycidyl compounds, hydrotalcites, alkali metal/alkaline earth metal aluminosilicates, alkali metal/alkaline earth metal hydroxides, alkaline earth metal oxides or alkaline earth metal (hydrogen) carbonates or metal carboxylates, phosphites, plasticizers, antioxidants, fillers, pigments, light stabilizers, lubricants and epoxidized fatty esters.

9. The method of claim 7, further comprising 0.4 phr of an ester lubricant.

10. The method of claim 7, further comprising 1.0 phr of a sodium zeolite.

11. The method of claim 7, further comprising 1.0 phr of a bisphenol A diglycidyl ether.

12. The method of claim 7, wherein the sodium perchlorate salt is a sodium perchlorate monohydrate solution.

* * * * *

UNITED STATES PATENT AND TRADEMARK OFFICE
CERTIFICATE OF CORRECTION

| | | |
|---|---|---|
| PATENT NO. | : 7,671,118 B2 | Page 1 of 1 |
| APPLICATION NO. | : 11/391836 | |
| DATED | : March 2, 2010 | |
| INVENTOR(S) | : Wehner et al. | |

It is certified that error appears in the above-identified patent and that said Letters Patent is hereby corrected as shown below:

On the Title page, item (62) titled Related U.S. Application Data, should read as shown below:
Division of application No. 10/467,947 filed as application No. PCT/EP01/14606 on Dec. 12, 2001, now Pat. No. 7,077,981.

Signed and Sealed this
Twenty-first Day of June, 2011

David J. Kappos
*Director of the United States Patent and Trademark Office*